United States Patent [19]

Röhm

[11] 4,319,516
[45] Mar. 16, 1982

[54] FAN-COOLED ACTUATOR FOR POWER CHUCK

[76] Inventor: Günter H. Röhm, Heinrich-Röhm-Str. 50, 7927 Sontheim, Fed. Rep. of Germany

[21] Appl. No.: 90,300

[22] Filed: Nov. 1, 1979

[30] Foreign Application Priority Data

Nov. 4, 1978 [DE] Fed. Rep. of Germany ....... 2847950

[51] Int. Cl.³ ........................................... B23B 31/30
[52] U.S. Cl. ...................................... 91/420; 92/106; 92/144; 279/4
[58] Field of Search .................... 91/420; 92/106, 108, 92/144; 279/4

[56] References Cited

U.S. PATENT DOCUMENTS

| | | | |
|---|---|---|---|
| 2,835,227 | 5/1958 | Gamet | 92/106 |
| 3,748,968 | 7/1973 | Pinto | 91/420 |
| 3,922,952 | 12/1975 | Roddy et al. | 91/420 X |
| 4,221,160 | 9/1980 | Selden | 91/420 X |

*Primary Examiner*—Gerald A. Michalsky
*Attorney, Agent, or Firm*—Karl F. Ross

[57] ABSTRACT

A power-chuck actuator has an actuator body forming an axially throughgoing passage and formed centered on this axis with an annular piston displaceable axially forwardly and backwardly and having a collar projecting from the front of the actuator. This collar can be connected to the actuating element of a power chuck whose chuck body can be bolted to the front end of the actuator body. In addition the actuator body has a backwardly extending sleeve on which is carried a connector body that is normally held against rotation and that is provided with hydraulic connections for pressurizing the compartments axially flanking the piston to operate the actuator. The actuator body is provided with a fan aligned with axially throughgoing passages of the connector body so that as the two bodies rotate relative to each other air is sucked through these passages by the fan to cool the actuator.

9 Claims, 3 Drawing Figures

4,319,516

FAN-COOLED ACTUATOR FOR POWER CHUCK

FIELD OF THE INVENTION

The present invention relates to a hydraulic actuator. More particularly this invention concerns an actuator usable to open and close a power chuck.

BACKGROUND OF THE INVENTION

A power chuck, such as described in my copending application Ser. Nos. 40,126 (now abandoned); 40,127 (now U.S. Pat. No. 4,243,236); 40,128 (now U.S. Pat. No. 4,243,237); 40,271; 40,272; and 40,433 (now abandoned), all filed May 18, 1979, has a chuck body which is mounted on a lathe spindle and is rotated thereby. Radially displaceable jaws on the chuck body are all coupled to an actuating member which is displaceable axially relative to the chuck body to radially displace the jaws thereof into or out of engagement with a workpiece. Typically the lathe spindle as well as the chuck are tubular so that rod stock can be fed axially through the spindle to the chuck for serial production of like workpieces, in particular when the lathe is operated as a screw machine.

A standard actuator, such as described in U.S. Pat. No. 2,835,227 or the corresponding German patent publication No. 1,018,696 filed 8 March 1954 by L. Gamet, has an actuator body that is fixed to the chuck body, a piston that is axially reciprocal within the actuator body and which is connected to the actuating element of the chuck, and a connector body which is rotatable on the actuator body and carries hydraulic connections for pressurizing the compartments in the actuator body that axially flank the piston. In this arrangement the piston is formed as a radially projecting flange on a sleeve that is axially slidable within the actuator body, and that in turn is fixed to another sleeve that extends axially out of the actuator for connection to the actuating element of the chuck.

The connector body is mounted via roller bearing on the actuator body with extremely small clearance in at least one location. At this location one of the bodies is formed with circumferential grooves open toward the other body which in turn is formed with radially extending passages aligned with these grooves. The connector body has hydraulic connections connectable via a valve to a source of fluid under pressure and a sump to pressurize the compartments and operate the chuck by the actuator.

The hydraulic fluid or oil used to pressurize the compartments flanking the piston therefore passes across a very narrow gap between the two bodies, forming a boundary layer. As these two bodies fit together very well, but without touching, this boundary layer acts as a fairly effective seal between the passages relative to each other and between the passages and the surrounding atmosphere. In fact the amount of leakage from this boundary layer can be easily controlled so that it serves to lubricate the working parts of the actuator.

The shear in this oil film, however, creates considerable heat. As the radius between the film and the axis increases, the amount of shear also increases considerably. Since such an actuator must normally form an axially throughgoing passage, limits are set to reduction of this radius, so that under the best of circumstances the radial spacing will be relatively large.

As a result there is considerable heating of this boundary layer. It is therefore common practice, as suggested in the above-cited German patent publication, to provide the actuator and/or connector bodies with cooling fins. Furthermore it is standard procedure to circulate the hydraulic fluid through a cooler before returning it to the arrangement. The first expedient has proven itself relatively ineffective in dissipating large amounts of heat, and presents dangerous radially extending vanes on which a lathe operator can be hurt. The second expedient is relatively expensive, increasing first and operating costs.

OBJECTS OF THE INVENTION

It is therefore an object of the present invention to provide an improved power-chuck actuator.

Another object is to provide such an actuator which is not subject to the above-described overheating problem.

SUMMARY OF THE INVENTION

These objects are attained according to the instant invention by providing the actuator with fan means constituted as a fan carried on or coupled to the actuator body. The connector body is formed with passages opening at the intake or output side of this fan. When the two bodies rotate relative to each other, therefore, air will be forced through these passages by the fan to cool the actuator.

According to further features of this invention the connnector body has a pair of concentric and radially spaced tube sections. The inner tube section forms the outer wall of a compartment in which oil from the boundary layer collects. The space between the inner and outer tubes opens at its ends at arcuate slots. Heat-dissipating ribs bridge these slots, and the fan is constituted as a multiplicity of radially extending vanes carried on a wheel bolted directly on the back face of the actuator body. These vanes are axially aligned with the slots at the other end of this space between the two tube sections. Thus as the actuator body rotates relative to the connector body the fan will suck air in through the space formed between these two tube sections to effectively dissipate heat from the connector body.

According to another feature of this invention the connector body is formed with an axially forwardly projecting extension projecting beyond the space in which the fan is provided. This extension is formed with a circumferential array of angularly equispaced throughgoing holes constituting a protective mesh or screen level with the fan. Thus the outer surface of the actuator according to this invention will be relatively smooth and free of projections, so that an operator of a machine using such an actuator is not likely to hurt himself or herself on the fan.

According to further features of this invention the actuator body is formed centered on the axis with an inner axially forwardly extending annular wall, with an outer axially forwardly extending annular wall forming with the inner wall an annular chamber, and with an annular end wall generally axially closing the chamber and having an inner periphery defining with the inner wall an axially forwardly open annular slot. The piston according to this invention is annular and axially forwardly and backwardly displaceable in the chamber. It has an axially forwardly projecting collar extending out of the chamber through the slot and having an outer surface sealed against the inner periphery of the end wall, which is advantageously bolted to the front edge of the outer wall, and an inner surface sealed against the inner wall. Thus it is possible to reduce the inner diameter of the connector body greatly, so that not only is heat buildup minimized in the chuck according to this invention, but the heat that is generated can readily be dissipated by the built-in fan.

SPECIFIC DESCRIPTION

Figure 1:
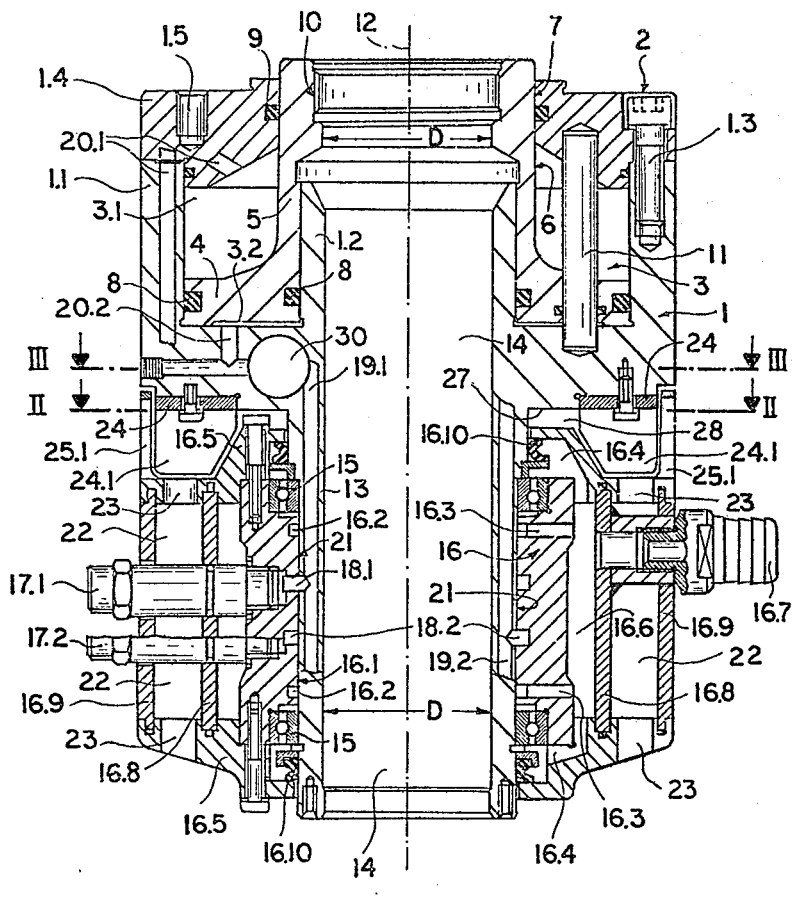
FIG. 1 is an axial section through a power actuator according to this invention.

The power actuator according to this invention has a housing 1 formed integrally with an annular outer wall 1.1 spaced relative to a central axis outwardly from an annular inner wall 1.2. Bolts 1.3 secure a flat cover plate 1.4 to the axial forward edge of the wall 1.1 to define a front face 2 for the actuator body 1. Threaded holes 1.5 in the end plate 1.4 serve for mounting a power-chuck body to the end face 2. The body 1 therefore forms between the walls 1.1, 1.2 and 1.4 an annular chamber 3 subdivided by an annular piston 4 into a front compartment 3.1 and a back compartment 3.2. This piston 4 has an axially forwardly extending collar 5 that extends axially forwardly out of the compartment 3 through a slot or annular gap 6 formed between the cylindrical inner peripheral surface 7 of the end plate 1.4 and the outer cylindrical peripheral surface 8 of the inner annular wall 1.2. Seal rings 9 are provided to prevent leakage at the gap 6. The sleeve or collar 5 is formed internally with a screwthread 10 into which the drive or actuating body of the power chuck to be operated by this actuator is screwed. Axially extending antirotation pins 11 fixed in the body 1 pass through the piston 4 and prevent it from rotating relative to the body 1.

In addition the body 1 is formed with an axially backwardly extending sleeve 13 defining an axial passage 14 through the entire power actuator. The inner diameter D of the collar 6 is approximately the same as that of the passage 14, so that rod stock can be fed through the actuator as well as through the power chuck operated by it in the manner well known in the art, and of particular interest on lathes acting as screw machines.

A connector housing 16 is supported by axially spaced roller bearings 15 on the sleeve extension 13 of the body 1, so that this connector housing 16 can rotate relative to the body 1 about the axis 12. Normally this connector housing is held nonrotatable while the housing 1 rotates jointly with the chuck it is attached to. The housing 16 is formed with a cylindrical central bore 16.1 which is only at most few hundredths of a millimeter larger in diameter than the outside diameter of the cylindrical backward extension 13. In addition this housing 16 is formed with a pair of axially spaced and radially inwardly open grooves 16.2 into which open radially throughgoing passages 16.3.

The housing 16 also is provided with a pair of cap-shaped annular end plates 16.5 defining annular passages 16.4 at the opposite ends of an axially extending and centered compartment 16.6 into which the passages 16.3 open. A tube section 16.8 bridges the end caps 16.4 and defines the outer wall of the compartment 16.6, with an oil-drain outlet 16.7 being connected to this tube section 16.8. Normally the power actuator is oriented with the axis 12 horizontal and the oil-drain outlet 16.7 directed downwardly. Another tube section 16.9 is placed between the end plates 16.5 and lies outwardly of the tube section 16.8. Glands 16.10 are provided at the ends of the annular passages 16.4.

A pair of hydraulic connection nipples 17.1 and 17.2 open at their inner ends into respective radially inwardly open grooves 18.1 and 18.2 that open into respective passages 19.1 and 19.2 (see FIG. 2) that in turn communicate with respective axially extending passages 20.1 and 20.2 that open into the compartments 3.1 and 3.2 of the piston chamber 3.

There is, therefore, fluid flow across the gap 21, having a radial dimension of at most a few hundredths of a millimeter, between the connector housing 16 and the body extension 13. Any oil leaking axially along the interface between the two parts will flow into the radial grooves 16.1 and 16.2 flanking the two grooves 18.1 and 18.2, and thence will flow out through the radial passages 16.3 into the compartment 16.6, whence the oil can drain off through the drain 16.7.

Figure 2:
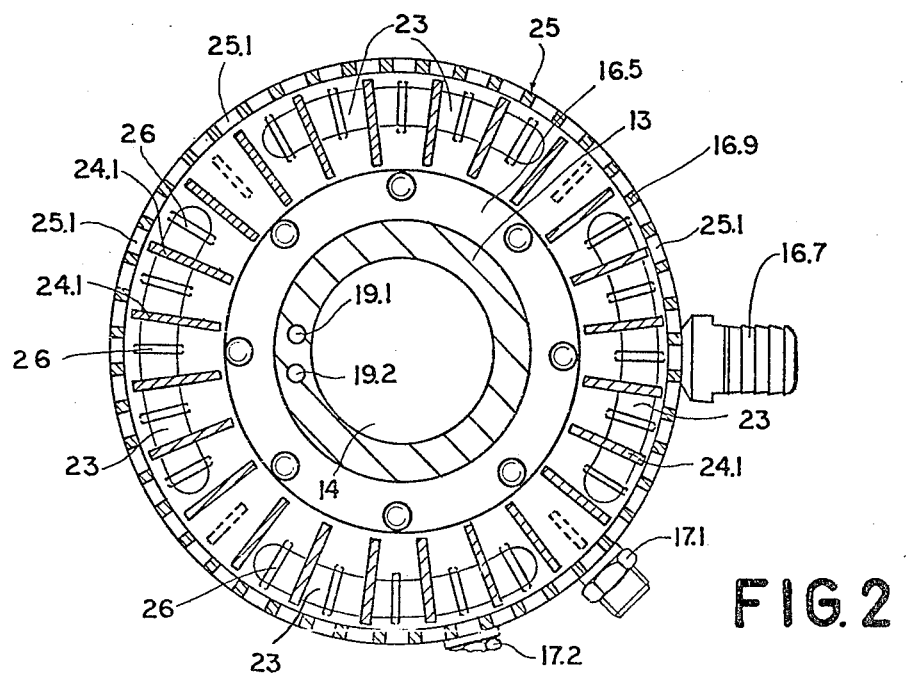
FIGS. 2 and 3 are sections taken respectively along lines II—II and III—III of FIG. 1.

The two tube sections 16.8 and 16.9 define an annular axially extending passage 22 opening externally at its axial ends through arcuate holes 23 best seen in FIG. 2. The two bodies 1 and 16 form between their axially confronting ends a radially outwardly open groove or space 28. An annular fan ring 24 is screwed to the rear face 27 of the chuck body 1 in this space 28 and has a plurality of vanes 24.1. In addition the connector housing 16 is formed with an axially forwardly projecting extension 25 formed with a multiplicity of radially throughgoing holes 25.1 axially level with the vanes 24.1 and constituting a protective screen for the fan 24. Thus rotation of the chuck body 1 about the axis 12 at high speed relative to the connector body 16 will cause the fan 24 to suck air axially in through the rear holes 23, then through the compartment 22, then through the front holes 23, and will expel the air radially outwardly through the holes 25.1, thereby cooling the connector body 16. To aid in heat dissipation ribs 26 are formed in the body 16 that bridge the openings 23 as shown in FIG. 2. The faster the relative rotation of the two bodies 1 and 16, the greater will be the air throughput through the chamber 22, compensating for the greater heat development at higher speed. Thus the actuator according to this invention is self-cooling.

Figure 3:
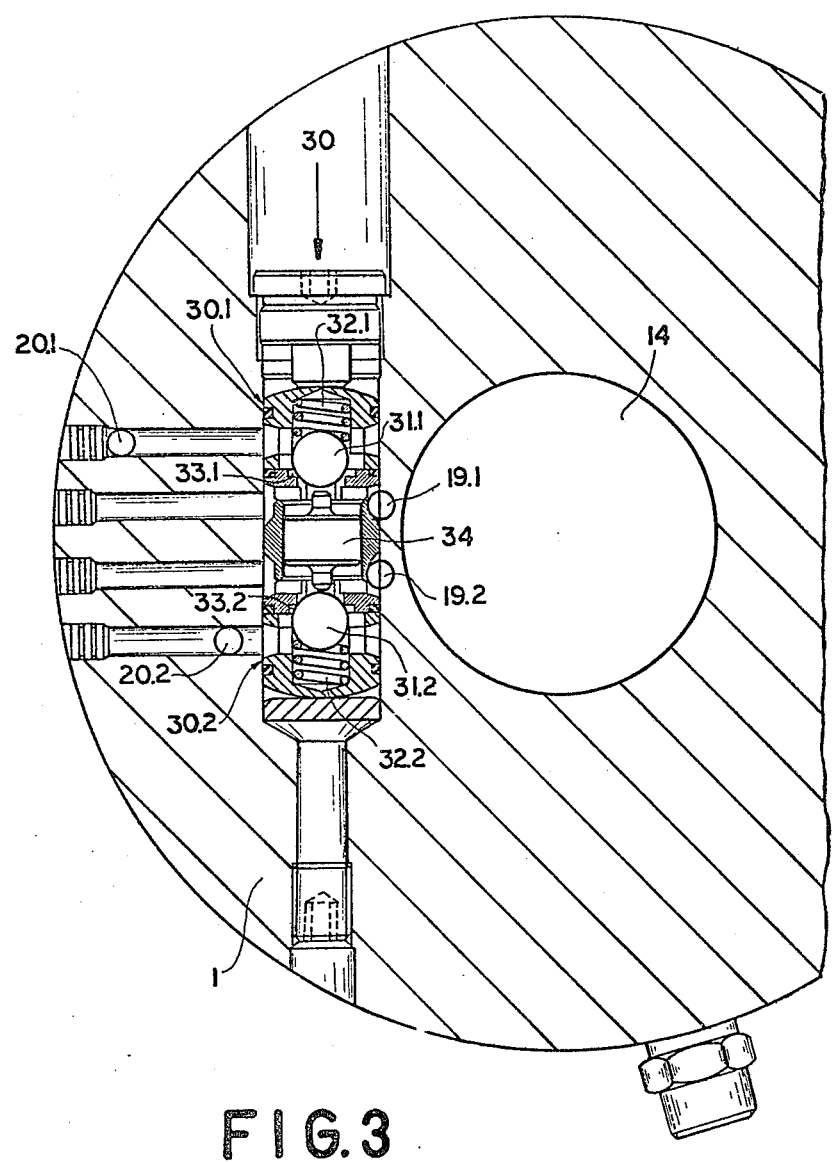

FIG. 3 shows how the chuck is provided with a double-safety valve 30 comprised of a pair of cages 30.1 and 30.2 housing respective valve balls 31.1 and 31.2 biased by respective compression springs 32.1 and 32.2 against respective seats 33.1 and 33.2. A control piston 34 is chordally displaceable betweeen the two balls 31.1 and 31.2 and can displace either of these balls away from its respective seat. The ball 31.1 therefore forms a check valve normally effective to prevent flow from the passage 20.1 to the passage 19.1, and the ball 31.2 normally acts as a check valve preventing flow backwardly from the passage 20.2 to the passage 19.2. So long as the piston 34 remains in the illustrated central position flow out of either of the chambers 3.1 and 3.2 is impossible.

When, however, one of the passages 19.1 or 19.2 is pressurized the chamber between the respective valve ball 31.1 or 31.2 and the piston 34 will become pressurized, so as simultaneously to lift the respective ball off its seat, and to push the piston 34 in the opposite direction to lift the other ball off its seat also. For example if the passage 19.1 is pressurized the ball 31.1 will be lifted off its seat 33.1 by the pressure effective upwardly, as seen in FIG. 3, against it, while the piston 34 will be pressed downwardly by the same pressure to move the ball 31.2 downwardly away from its seat 33.2.

This safety-valve structure 30 therefore ensures that absent positive actuation of the chuck by pressurization of one of the passages 19.1 or 19.2 via the respective connection 17.1 or 17.2, the piston 4 would be unable to move in the chamber 3. Thus if for some reason or other pressure is lost, the chuck operated by the actuator according to this invention will not automatically loosen, but will remain locked on its workpiece. This expedient therefore makes the system substantially safer, and even allows the pressure to the actuator to be cut off, if necessary, once the chuck has been adequately tightened on the workpiece.

I claim:

1. A hydraulic actuator comprising:
   an actuator body centered on an axis, formed with a chamber, and having an axially backwardly projecting extension;
   a piston axially subdividing said chamber into front and back compartments and having a portion projecting axially forwardly from said actuator body;
   a connector body carried on said extension and rotatable thereon about said axis, said bodies having confronting end faces together forming an annular space, said connector body having a pair of end caps and concentric and radially spaced inner and outer tube sections axially bridging said end caps and forming an annular chamber constituting an axially throughgoing passage opening at said space, said section, caps, and connector body being of heat-conducting material; and
   fan means including a fan in said space and operatively connected to said actuator body for passing air through said passage on relative rotation of said bodies.

2. The actuator defined in claim 1 wherein said fan includes an annular array of vanes on said actuator body in said space and centered on said axis.

3. The actuator defined in claim 2 wherein said one of said bodies is formed with an axially extending skirt covering said space and formed with radially throughgoing holes aligned with said space.

4. The actuator defined in claim 3 wherein said skirt is on said connector body.

5. The actuator defined in claim 1 wherein said inner tube sections forms with said connector body an oil-connecting chamber.

6. The actuator defined in claim 1 wherein said end caps are formed with axially open holes constituting the ends of said passage.

7. The actuator defined in claim 1, further comprising heat-conducting ribs bridging said passage.

8. The actuator defined in claim 1 wherein said actuator body has centered on said axis inner and outer annular walls forming said chamber and with an end wall connected to said outer wall and having an inner periphery forming an annular gap with said inner wall, said piston having a collar projecting axially forwardly out of said chamber through said gap and having an inner surface sealed against said inner wall and an outer surface sealed against said inner periphery.

9. The actuator defined in claim 1, further comprising valve means in said actuator body for preventing fluid flow into and out of said chamber to either axial side of said piston absent pressurization of one of said chambers above a predetermined minimum level.

* * * * *